Dec. 30, 1969   J. B. TURNBULL   3,486,762
MOTOR VEHICLE SUSPENSION
Filed Oct. 17, 1967
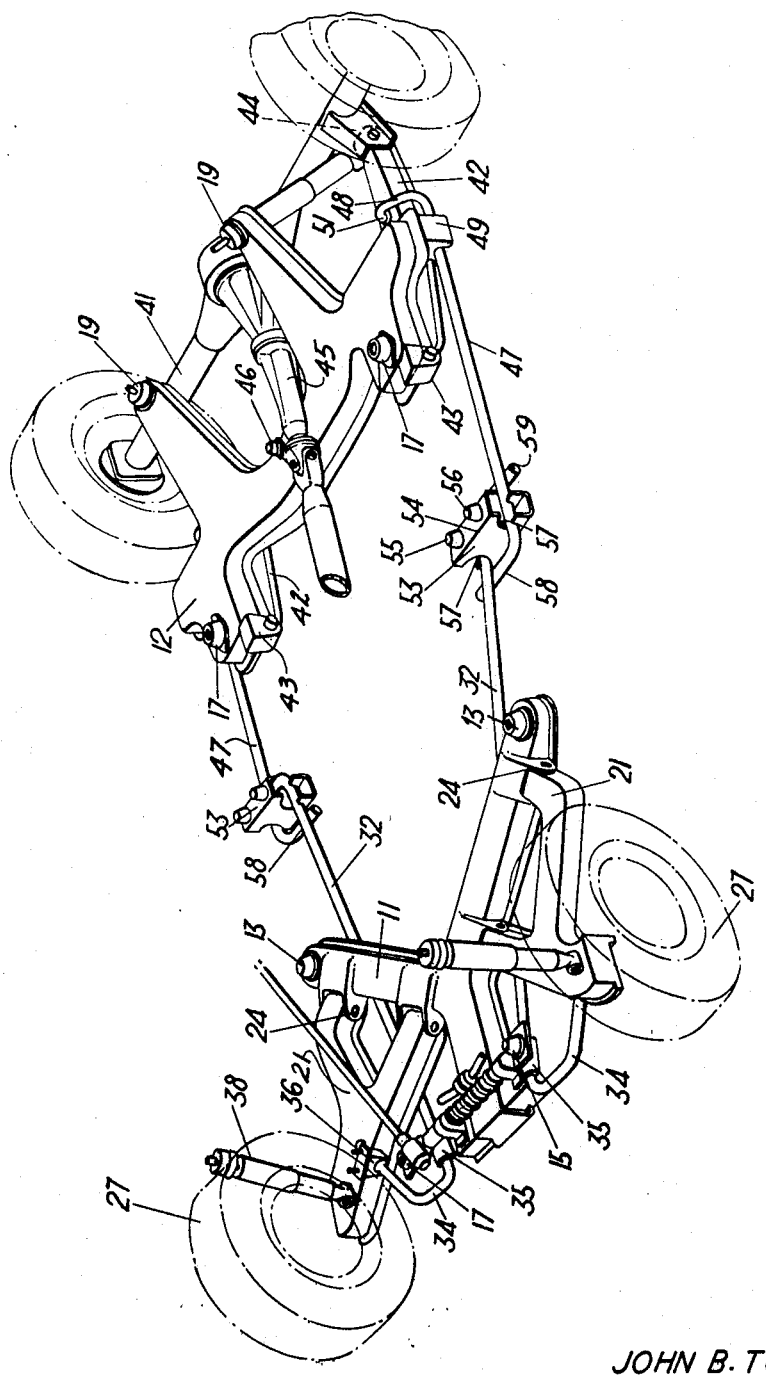
JOHN B. TURNBULL
INVENTOR
BY John R. Faulkner
   Clifford L. Sadler
ATTORNEYS

United States Patent Office 3,486,762
Patented Dec. 30, 1969

3,486,762
MOTOR VEHICLE SUSPENSION
John B. Turnbull, Kenilworth, England, assignor to Ford Motor Company, Dearborn, Mich., a corporation of Delaware
Filed Oct. 17, 1967, Ser. No. 676,388
Int. Cl. B60g 11/18, 11/00
U.S. Cl. 280—104                                6 Claims

ABSTRACT OF THE DISCLOSURE

A motor vehicle suspension system in which a longitudinally extending torsion bar is connected to each wheel suspension and the bars for the front and rear are interconnected on the left and right sides, respectively.

BACKGROUND OF THE INVENTION

The present invention is an improvement of the limited interconnected suspension system described in a copending patent application entitled "Vehicle Variably Interconnected Suspension System," Ser. No. 544,756, filed Apr. 25, 1966, now Patent 3,386,751, issued June 4, 1968, by William D. Allison and assigned to the assignee of the present invention.

This patent describes a motor vehicle suspension in which, at each side of the vehicle, a longitudinally extending front torsion bar spring couples the unsprung part of the front suspension to an intermediate member connected to the frame. The rear suspension of the vehicle includes a longitudinally extending rear torsion bar spring which couples the unsprung part of the rear suspension to the same intermediate member. The forces exerted by the front and rear torsion bar springs act on the intermediate member in opposition to each other. The intermediate member is coupled to the sprung part of the vehicle through a resilient means.

The present invention is concerned with an arrangement by which the front and rear torsion bars are connected to the intermediate member.

BRIEF SUMMARY OF THE INVENTION

According to the present invention, a motor vehicle suspension of the general type described in Patent 3,386,751 would also have the following features. At each side of the vehicle, the torsion bars are supported at spaced apart locations on an intermediate member. Each torsion bar extends past the intermediate member and has an integral lever arm which abuts against the other torsion bar so that the torque in each torsion bar is reacted by its support on the intermediate member and by its abutment with the other torsion bar.

BRIEF DESCRIPTION OF THE DRAWINGS

The invention is particularly described with reference to the accompanying drawing which is a perspective view of a motor vehicle suspension according to the presently preferred embodiment of this invention.

DETAILED DESCRIPTION OF THE INVENTION

The drawings shows front and rear suspension subframes 11 and 12 which are mounted resiliently on the underside of the vehicle body (not shown) through resilient mountings 13, 15, 17 and 19.

The front suspension is of the single leading arm type and is described in greater detail in Patent 3,400,445, entitled "Leading Arm Suspension System," filed Nov. 3, 1966, and issued Sept. 10, 1968, to Achille C. Sampietro and assigned to the assignee of the present invention. Left and right leading arms 21 are pivotally mounted by pivots 24 to the subframe 11 and extend generally forward therefrom. The two front wheels 27 are supported on hub carriers (not shown) which are, in turn, connected by king pins (not shown) to the leading arms 21. Steering is effected by a rack and pinion assembly 31 which is connected by two track rods (not shown) to steering arms (not shown) on the hub carrier. The front springs are longitudinally extending torsion bars 32 that have integral lever arms 34 at their forward ends. The lever arms 34 extend from pivots 35 on the subframe to resilient mountings 36 on the leading suspension arms 21. The rear supports of the front torsion bars 32 will be described below. Two front shock absorbers 38 are provided that extend between the arms 21 and the vehicle body.

The rear suspension is constituted by a live rear axle 41 which is located longitudinally by two trailing links 42 that extend between subframe pivots 43 and axle pivots 44. The nose of the differential 40 is extended to form a torque tube 45 and this is connected to the body through a resilient mounting 46. The mounting 46 is offset to the right to prevent drive shaft torque reaction from lifting one rear wheel.

The rear springs are torsion bars 47 which have integral lever arms 48 that extend laterally between resilient mountings 49 on the subframe 12 and resilient mountings 51 on the trailing links 42. The lever arms 48 locate the rear axle laterally with a degree of lateral compliance provided principally by the resilient subframe mounting 49. Rear shock absorbers 52 extend between the axle mounting points of the trailing links 42 and the subframe 12. They are inclined laterally and tend to damp lateral movement or compliance permitted by the resilient mountings 49 for the torsion bar 47.

The front and rear torsion bars 32 and 47 are connected together at both sides of the vehicle and to the vehicle body by intermediate members 53. Each member 53 is a rectangular box section member bent from sheet steel and welded at 54. It extends in a generally transverse direction across the vehicle and is resiliently mounted to the vehicle body by two rubber spring members 55 and 56. Both the inboard and outboard ends of the member 53 have slots 57 which are shaped to receive a torsion bar and to prevent the torsion bar from slipping out. The torsion bars 32 and 47 extend through and are supported in these slots 57 in the intermediate member 53 and have integral lever arms 58 and 59 formed by bending the ends of the bars.

The lever arms 58 of the rear torsion bars 47 lie under and abut against the front torsion bars 32 and similarly, the lever arms 59 of the front torsion bars 32 lie under and abut against the rear torsion bars 47. As the torsion bars 47 and 32 are normally stressed to support the weight of the vehicle on the suspension, each lever arm 58, 59 is held firmly against the other torsion bar.

OPERATION

The front and rear suspensions are interconnected by the intermediate member 53 as follows. If one of the front wheels 27 strikes a bump and is moved upwardly in jounce, the effected torsion bar 32 is wound up further and applies a torque to the intermediate member 53. This torque is reacted partly by the rear torsion bar 47 and partly by the body of the vehicle through the resilient mounts 55 and 56. The proportioning of the torque reaction depends upon the relative stiffnesses of the resilient mounts 55, 56 and the rear torsion bar 47. If the resilient mounting of member 53 is very flexible, it offers little resistance to rotation and most of the torque in the front bar 32 is transmitted to the rear bar 47. If the resilient mountings 55 and 56 are stiff, they absorb most of the torque from the front torsion bar 32 with very little movement and transmit only a small torque and rotation to the rear torsion bar 47.

The torque transmitted to a rear torsion bar tends to move the adjacent rear wheel down (i.e. move the body up on the wheel) and thus, raises the rear of the vehicle. The front of the vehicle is also raised as a direct result of hitting the bump that causes the original jounce movement. Thus, striking a bump with a front wheel causes both the front and read of the vehicle to rise up. Similarly, if a rear wheel strikes a bump the interconnection causes the front of the vehicle to rise as well as the rear of the vehicle.

An advantage of the interconnection arrangement of this invention is that very wide tolerances can be allowed in the lengths of the torsion bars and in the longitudinal positions of the front and rear suspensions of the body without causing any difficulty in fitting the torsion bars to the intermediate member.

The foregoing description presents the presently preferred embodiment of this invention. Modifications and alterations may occur to those skilled in the art that will come within the scope and spirit of the following claims.

I claim:

1. A suspension system for a motor vehicle having a vehicle body support structure, first and second road wheels, first and second suspension means connecting said wheels to said structure, a first torsion spring connected to aid first suspension means and a second torsion spring connected to said second suspension means, said torsion springs having adjacent ends, said torsion springs each having a main spring portion, an intermediate member interposed between said main spring portions, each of said springs having a lever arm portion extending at an angle to its main spring portion and engaging the other of said torsion springs at a location spaced from the lever arm portion of said other spring.

2. A suspension system for a motor vehicle as defined in claim 1 and including:
the lever arm portion of each of said springs engaging the main spring portion of the other of said springs.

3. A suspension system for a motor vehicle as defined in claim 1 and including:
said road wheels being longitudinally spaced apart, said torsion springs each having a main spring portion extending in a generally longitudinal direction.

4. A suspension system for a motor vehicle as defined in claim 1 and including:
said intermediate member being connected to said support structure.

5. A suspension system for a motor vehicle as defined in claim 1 and including:
said road wheels being longitudinally spaced apart, said main spring portions extending in a generally longitudinal direction, said intermediate member being resiliently connected to said support structure.

6. A suspension system for a motor vehicle as defined in claim 1 and including:
said road wheels being longitudinally spaced apart, said main spring portions extending in a generally longitudinal direction, the lever arm portion of each of said springs engaging the main spring portion of the other of said springs, said intermediate member being resiliently connected to said support structure.

References Cited

UNITED STATES PATENTS

| | | | |
|---|---|---|---|
| 3,386,751 | 6/1968 | Allison | 280—104 |
| 2,099,819 | 11/1937 | Mercier | 280—104 |
| 2,002,249 | 5/1935 | Oyston | 280—104 X |
| 2,941,815 | 6/1960 | Muller | 280—124.3 |

PHILIP GOODMAN, Primary Examiner

U.S. Cl. X.R.

280—124